(12) United States Patent
Ginsberg

(10) Patent No.: US 7,849,463 B2
(45) Date of Patent: *Dec. 7, 2010

(54) DYNAMICALLY VARIABLE IDLE TIME THREAD SCHEDULING

(75) Inventor: Michael Ginsberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1058 days.

This patent is subject to a terminal disclaimer.

(21) Appl. No.: 11/559,865

(22) Filed: Nov. 14, 2006

(65) Prior Publication Data

US 2007/0074219 A1  Mar. 29, 2007

Related U.S. Application Data

(63) Continuation of application No. 09/843,465, filed on Apr. 25, 2001, now Pat. No. 7,137,117.

(60) Provisional application No. 60/208,723, filed on Jun. 2, 2000.

(51) Int. Cl.
*G06F 9/46* (2006.01)
*G06F 1/00* (2006.01)

(52) U.S. Cl. .................. 718/102; 718/107; 713/322; 713/323

(58) Field of Classification Search .......... 718/103, 718/107
See application file for complete search history.

(56) References Cited

U.S. PATENT DOCUMENTS

| | | | |
|---|---|---|---|
| 5,247,677 A | 9/1993 | Welland et al. | |
| 5,369,771 A * | 11/1994 | Gettel | 713/322 |
| 5,535,401 A * | 7/1996 | Rawson et al. | 713/340 |
| 5,875,296 A | 2/1999 | Shi et al. | |
| 6,047,268 A | 4/2000 | Bartoli et al. | |
| 6,079,025 A | 6/2000 | Fung | |
| 6,158,012 A | 12/2000 | Watts, Jr. | |
| 6,173,409 B1 | 1/2001 | Watts, Jr. et al. | |
| 6,226,752 B1 | 5/2001 | Gupta et al. | |
| 6,389,541 B1 | 5/2002 | Patterson | |
| 6,421,768 B1 | 7/2002 | Purpura | |
| 6,438,668 B1 | 8/2002 | Esfahani et al. | |
| 6,438,704 B1 | 8/2002 | Harris et al. | |
| 6,499,102 B1 | 12/2002 | Ewertz | |
| 6,584,571 B1 | 6/2003 | Fung | |
| 6,763,468 B2 | 7/2004 | Gupta et al. | |
| 6,779,182 B1 | 8/2004 | Zolnowsky | |
| 6,971,036 B2 * | 11/2005 | Freed | 713/322 |

* cited by examiner

*Primary Examiner*—Lewis A Bullock, Jr.
*Assistant Examiner*—Jennifer N To
(74) *Attorney, Agent, or Firm*—Lee & Hayes, PLLC

(57) ABSTRACT

Systems and methods for dynamically variable idle time thread scheduling are described. In one aspect, threads are scheduled according to a predetermined periodic rate. If there are no threads to execute, one or more hardware elements and program modules are deactivated to an idle state for a dynamic variable amount of time. The dynamic variable amount of time is independent of the predetermined periodic rate at which threads are scheduled. The dynamic variable amount of time is also independent of key press events, and any event associated with release of a resource. Instead, the dynamic variable amount of time is based on a sleep state of a set of threads in a sleep queue.

17 Claims, 4 Drawing Sheets

DYNAMICALLY VARIABLE IDLE TIME THREAD SCHEDULING

RELATED APPLICATIONS

This patent application is a continuation of patent application Ser. No. 09/843,465, filed on Apr. 25, 2001, which is now U.S. Pat. No. 7,137,117 and hereby incorporated by reference.

This application claims the benefit of U.S. Provisional Application No. 60/208,723, filed Jun. 2, 2000, titled "Variable Idle Time Scheduling Algorithm".

BACKGROUND

Real-time performance is essential for time-critical responses required in high-performance applications such as telecommunications switching equipment, medical monitoring equipment, space navigation and guidance, and the like. Such applications must deliver responses within specified time parameters in real-time.

Real-time performance is typically provided by operating systems that use thread scheduling mechanisms. Such mechanisms schedule threads for execution on a thread priority basis. For example, Microsoft's WINDOWS CE® operating system provides two-hundred-fifty-six (256) priority levels in a basic round-robin scheduler. Threads of higher priority always run before threads of lower priority. Threads of equal priority run in a first-in-first-out round-robin fashion. For example, thread A runs, then thread B runs, followed by thread C, and back to thread A.

Thread scheduling mechanisms typically use a hardware timer to produce a system tick to determine a maximum amount of time or "quantum" of time that a thread can run in the system without being preempted. When a timer reaches the quantum of time, a thread is preempted to determine if there are other threads of equal or higher priority to execute, or run. The system tick is the rate at which a hardware timer interrupt is generated and serviced by the operating system. When the timer fires, the operating system (OS) schedules a new thread for execution if one is ready to be scheduled. Thus, a thread's quantum is a multiple of the time between system ticks.

For example, FIG. 1 is a graph 100 that shows the relationship between thread execution and thread preemption. The vertical axis 101 represents a number of threads 102-1 through 102-N that are in queue for execution. The horizontal axis 103 represents the passage of time to illustrate servicing by the operating system of the system tick 104, which in turn results in a thread being scheduled and/or preempted if there are any threads ready to be scheduled. A system tick occurs once every time interval 106. The time interval can be any duration of time that is supported by a hardware timer, such as 10 milliseconds.

In this example, all threads 102 are of the same priority. In response to a first system tick 104-1, the scheduler executes thread 102-1 for time duration 106-1. The amount of time that a thread 102 will execute before being preempted to determine if there are any other threads to execute is known as a "thread quantum". Thus, each time interval 106 represents the thread quantum. The system tick is generated every thread quantum.

In response to system tick 104-2, the scheduler preempts the execution of thread 102-1 to run thread 102-2 for time duration 106-2. In response to system tick 104-3, the scheduler preempts the execution of thread 102-2 to run thread 102-... for time duration 106-.... In this manner, threads are scheduled and executed by a real-time operating system.

If there are no threads ready to be scheduled, meaning that all threads are blocked in the system, there is no work for an operating system to perform. All threads may be blocked in a system because threads often have to wait for one or more events to occur before continuing to execute. Such events include waiting for another thread to release a resource such as a file, waiting for a key-press event, or waiting for an amount of time to pass. Thus, a thread will often yield processor control to the thread scheduler by placing itself into a yield, inactive, or sleep state for a specified time period, such as a certain number of milliseconds before continuing execution.

A thread that specifies that it wants to yield or sleep for a millisecond ("sleep (1)") returns or "wakes up" on a system timer tick. If the system timer tick is set to 25 milliseconds, a sleep (1) would result in the thread yielding for at least 1 millisecond, but perhaps yielding up to 25 milliseconds because the timer is set to fire at 25 millisecond intervals. Thus, this thread will not be provided with the scheduling accuracy that it specified—in this example, a millisecond-resulting in poor real-time performance. However, if the system timer interrupt were fired every millisecond, a thread issuing a sleep (1) command would result in the thread sleeping for only a millisecond, which would be the precise amount of time that the thread requested to sleep. Of course, this is dependent on the priority of the thread, and the priority of other threads. This smaller system timer tick value of a millisecond provides the thread's specified scheduling accuracy, which results in higher real-time performance as compared with a scenario where the system tick is set to a larger value.

When there are no threads to schedule, the operating system typically saves power by deactivating or turning off the system's central processing unit (CPU) to place the operating system into an Idle state. The issuance of a system timer tick forces the operating system out of the Idle state by turning the CPU back on so that the operating system can determine if there are any new threads that are ready to be scheduled.

If no threads are ready to be scheduled, the operating system again places itself into an Idle state. Significantly, the frequency at which the system timer tick fires determines how often the system transitions from the Idle state to activate the operating system to determine if there are any threads to schedule. In other words, the amount of time between consecutive system ticks is also the amount of time that the operating system is deactivated when the system is in an Idle state. This amount of time is traditionally static and does not change. Thus, traditional systems typically use static idle time scheduling mechanisms.

Setting the system timer to a millisecond to obtain substantial real-time performance means that if there are no threads to schedule, the system will leave an Idle state every millisecond to activate the operating system to determine if there are any threads to schedule. Upon making this transition, the operating system may determine that there are no new threads to schedule, whereupon the operating system will again be deactivated for a millisecond by placing the system into the Idle state. The process of resuming the operating system when there are no new threads to reschedule is a power consuming process. On a battery-powered device, such transitions use valuable battery life and result in the depletion of limited power reserves.

Consumers are aware about the battery life of a product as the battery life can make or break a product's acceptance in the marketplace. Thus, OEMs and embedded developers, especially those involved in power management of battery powered devices, are concerned with the power efficiency aspects that are a consequence of a system timer interrupt firing every millisecond-especially when the system is idle.

To conserve battery power, OEMs typically preset the system timer, or thread quantum, to a constant of ten (10) milliseconds or greater to preserve the limited battery reserves on battery powered devices. However, as discussed above, increasing the value of the system timer in this manner results in poor real-time performance of time-critical applications because threads may not be provided with the scheduling accuracy required of such applications.

In light of the above, a system is needed that provides real-time thread scheduling performance essential to time-critical responses in high-performance applications without increasing power consumption.

SUMMARY

Systems and methods for dynamically variable idle time thread scheduling are described. In one aspect, threads are scheduled according to a predetermined periodic rate. If there are no threads to execute, one or more hardware elements and program modules are deactivated to an idle state for a dynamic variable amount of time. The dynamic variable amount of time is independent of the predetermined periodic rate at which threads are scheduled. The dynamic variable amount of time is also independent of key press events, and any event associated with release of a resource. Instead, the dynamic variable amount of time is based on a sleep state of a set of threads in a sleep queue.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

DETAILED DESCRIPTION

The following description sets forth a specific embodiment of a system and procedure that incorporates elements recited in the appended claims. The embodiment is described with specificity in order to meet statutory requirements. However, the description itself is not intended to limit the scope of this patent. Rather, the inventor has contemplated that the claimed subject matter might also be embodied in other ways, to include different elements or combinations of elements similar to the ones described in this document, in conjunction with other present or future technologies.

Exemplary System

Figure 1:
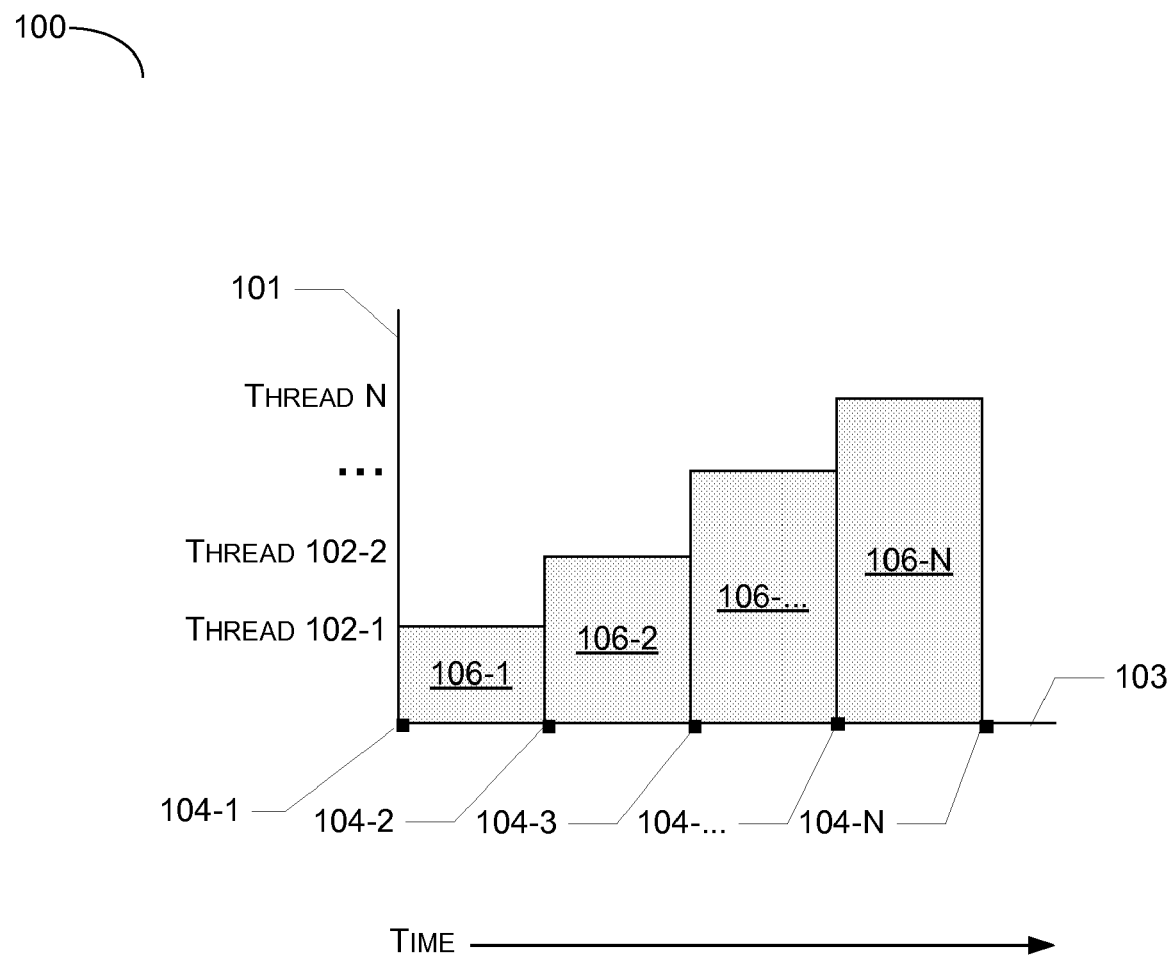
FIG. 1 is a graph that shows the relationship between thread execution and thread preemption.
Figure 2:
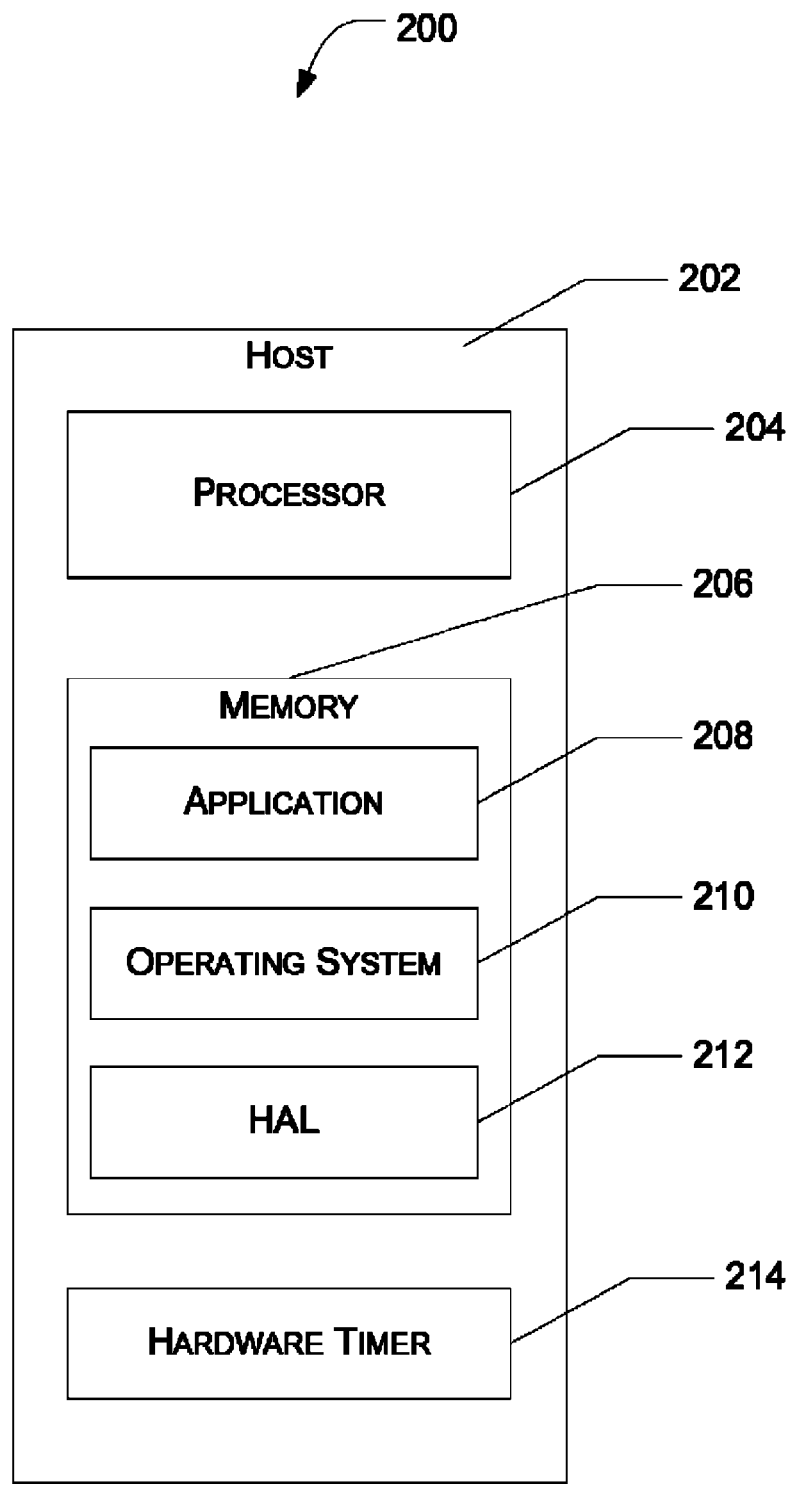
FIG. 2 is a block diagram that illustrates aspects of an exemplary system to provide dynamically variable idle time thread scheduling.

FIG. 2 shows aspects of an exemplary system 200 that provides dynamically variable idle time thread scheduling.

The system 200 provides an Idle function that allows the operating system to put components such as portions of the operating system, the CPU, one or more hardware elements coupled to the system, and the like, in standby mode for longer than the system tick rate before the components are re-activated to determine if there are any new threads to execute.

The dynamically variable idle time thread scheduling provides fine control over the scheduler and corresponding power consumption in a device. A high tick rate that provides precise thread scheduling accuracy can be utilized in a manner that does not require a device to jump out of an Idle function at that high tick rate to restart the operating system to determine if there are threads to execute. In other words, the amount of time that a system 200 with a high tick rate can remain in an Idle state is independent of the system tick rate that determines the thread quantum (the amount of time that a thread can execute before being preempted). Thus system 200 provides improved the power management capabilities as compared to traditional systems with a high tick rate.

System 200 includes host computer 202. The computer is a conventional desktop PC or other type of computer such as a handheld computer. The computer may or may not be diskless and have a limited memory capacity. For example, the computer may be part of industrial monitoring equipment, medical equipment, a point of sale terminal, a multimedia consumer appliance, a smart phone, a customer kiosk, or even part of a car.

Computer 202 has one or more processors 204 and one or more forms of computer-readable memory media 206 such electronic memory, magnetic storage media, optical storage media, or some other type of data storage. Programs are stored in memory 206 from where they are executed by processor 204. In this example, such programs include an operating system 200 such as the Microsoft WINDOWS CE, Linux, WindRiver, QNX, or Palm® operating systems.

The operating system provides various system services such as a thread scheduling mechanism to one or more application programs 208 running on the computer. Such system services interface with a hardware abstraction layer (HAL) 212, which is used by the operating system, and indirectly by the application programs, to set the system hardware timer 214. The HAL is a device specific program module that is provided by the computer's 202 manufacturer as is understood by those skilled in the art. However, the HAL could also be provided by another entity such as an operating system provider.

The operating system 210 thread scheduling mechanism is configured to schedule threads for execution at a periodic time interval, or thread quantum. The operating system sets this periodic time interval when computer 202 is powered up by communicating the periodic time interval to the HAL 212, which in turn interfaces directly with the hardware timer 214 to set the system tick to occur at the periodic time interval.

In one embodiment, the operating system 210 and the HAL 212 determine the amount of time when a next thread needs to be rescheduled by sharing the following variables:

dwPreempt—the time until the current thread should be preempted;

dwSleepMin—the time until the next scheduler interrupt is necessary;

ticksleft—the number of system timer ticks that have elapsed but have not been processed by the scheduler (thus a non-zero value causes a reschedule);

CurMSec—the time since the system booted;

DiffMSec—the time since the scheduler last ran; and dwPartialDiffMSec—a partial time count used in case the system comes out of idle in response to an external event such as a key-press before the system timer fired.

In response to each system tick from the hardware timer 214, the scheduler determines whether there are any new threads to schedule for execution. If there are no threads to schedule for execution, there is no work for the operating system to perform. Thus, the scheduler determines a maximum amount of time (dwSleepMin−DiffMSec) that it can idle, or sleep before it needs to schedule a new thread. This maximum amount of time is the amount of time that a thread can yield before needing to be scheduled for execution.

The maximum amount of time is dynamically variable since it is based on a sleep state of the set of threads in the sleep queue at that moment in time. This dynamically variable amount of time represents that amount of time that the system will remain idle before scheduling another thread for execution. This dynamically variable amount of time is completely independent of the periodic amount of time that is represented by the system's tick rate for scheduling threads.

The scheduler then requests the HAL 212 to place the system into an idle state and reduce the system's power consumption. This is accomplished by deactivating one or more components such as one or more modules of the operating system, one or more hardware elements coupled to the system (such as the CPU), and the like. Responsive, to receipt of the request, the HAL resets the system timer to generate a notification after the dynamically variable, or maximum amount of time has expired and deactivates the one or more components, thereby placing the system into an Idle state.

An external interrupt such as a key-press event may be received by the processor prior to the expiration of the maximum amount of time since the system was deactivated. If the system does not receive such an interrupt, the system will remain in the Idle state for an amount of time that is independent of the system tick rate at which threads are scheduled. (Handling of external interrupts is a special case that is discussed in greater detail below). The system timer 214 generates a timer notification upon expiration of the maximum amount of time, which is then received by the HAL 212. Because there is always the possibility of time skew, rather than just keeping track of timer ticks to determine if the maximum amount of time has expired, this implementation implements the following rules to determine if the maximum amount of time has expired, each of which will activate the scheduler:

ticksleft is greater than zero—meaning that potentially there are threads on the sleep queue waiting to run so don't idle, dwSleepMin is not zero, but less than DiffMSec (the sleep time has already passed), or when dwPreempt is not zero, but less than DiffMSec (the sleep time has already passed).

The triggering of any of these rules will result in the re-activation of the deactivated components such as re-activation of the processor 204, one or more operating system program modules, and the like. When the system 200 returns from idle, CurMSec and DiffMSec variables are updated to reflect the actual amount of time in milliseconds that has elapsed since the system was deactivated. Although this implementation measures time in milliseconds, other time intervals could be used as well.

With respect to the generation of an external event that is not a system timer interrupt, the described system is configured to receive a notification in response to an external event. External events can be any type of event such as a key-press event, a mouse-move event, a mouse click event, a scroll bar event, and the like. Responsive to receiving such a notification, the system processes the event and keeps track of the amount of time that has already passed since the scheduler last ran using the variable dwPartialDiffMSec. When the interrupt has been processed, if the requested idle time has not completely expired, the processor 204 is kept in a deactivated state until the requested idle time has completed. However, if the requested idle time has expired, the processor is activated Upon determining that the system 200 should be re-activated, the HAL resets the system timer 212 to a predetermined periodic time that represents the thread quantum, that periodic interval of time at which the scheduler looks for threads to schedule. The operating system 210 is activated by turning on the processor 204. In this manner, the system 200 provides a variable idle time thread scheduling mechanism that allows low power consumption with a higher system tick rate.

In one implementation, a predetermined periodic time interval, or thread quantum is every millisecond, providing precise thread scheduling and thread yield requests.

Exemplary Computer

Figure 3:
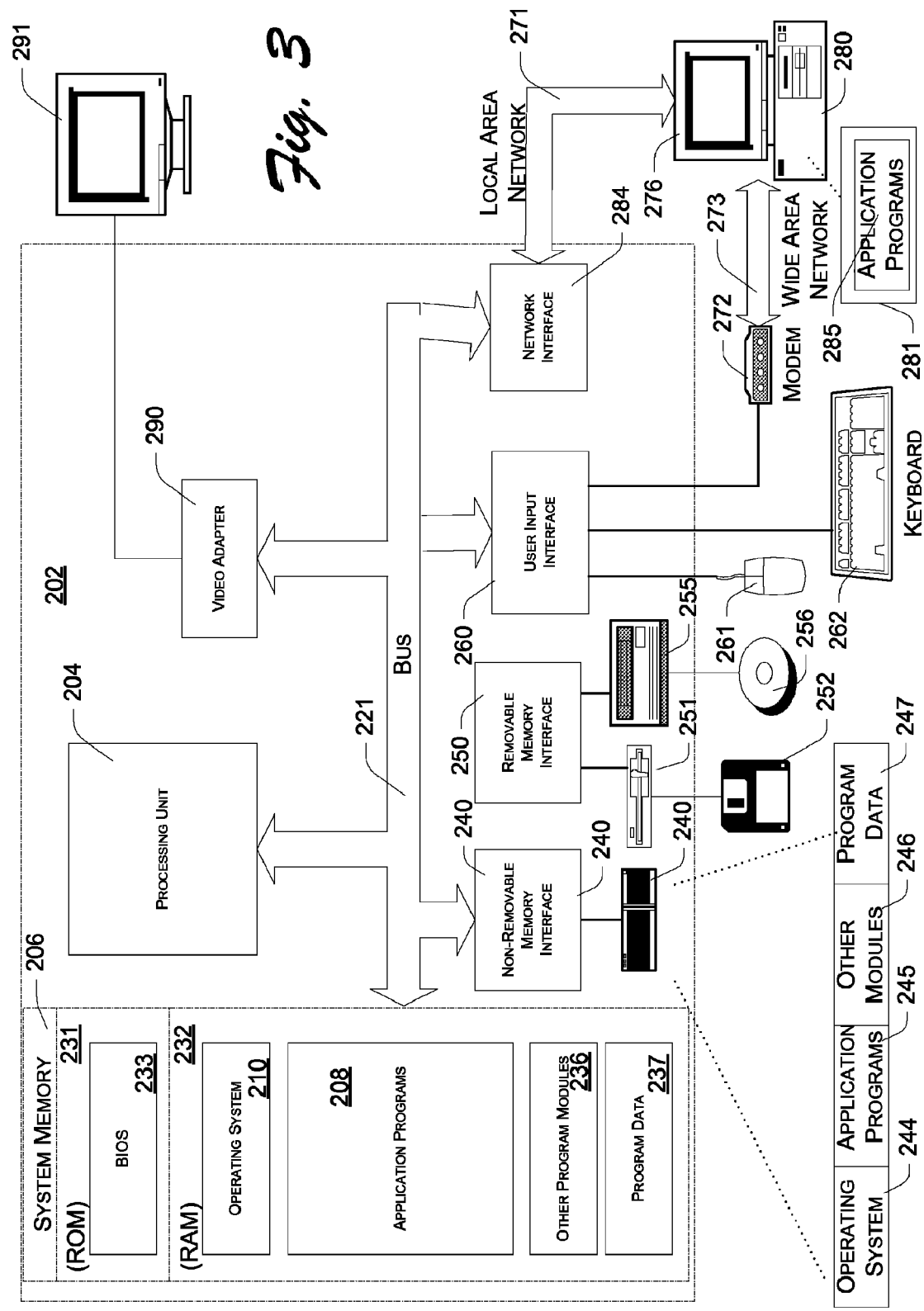
FIG. 3. is a block diagram that shows aspects of an exemplary computer that provides dynamically variable idle time thread scheduling.

FIG. 3 shows a computer 202 that forms a suitable environment for the system of FIG. 2 described above. The components shown in FIG. 3 are only examples, and are not intended to suggest any limitation as to the scope of the functionality of the subject matter; the subject matter is not necessarily dependent on the features shown in FIG. 3.

Generally, various different general purpose or special purpose computing system configurations can be used. Examples of well known computing systems, environments, and/or configurations that may be suitable for use with the subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The subject matter described herein includes these and other various types of computer-readable media when such media contain instructions programs, and/or modules for implementing the steps described below in conjunction with a microprocessor or other data processors. The subject matter also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 3, the components of computer 202 may include, but are not limited to, a processing unit 220, a system memory 206, and a system bus 221 that couples various system components including the system memory to the processing unit 204. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 202 typically includes a variety of computer-readable media. Computer-readable media can be any available media that can be accessed by computer 202 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 202. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 206 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 202, such as during start-up, is typically stored in ROM 231. RAM 232 typically contains data and/or program modules that are immediately accessible to and/or presently being operated on by processing unit 204. By way of example, and not limitation, FIG. 3 illustrates operating system 210, application programs 208, other program modules 236, and program data 237. As is well known, operating systems provide such low-level functions as module (process and dynamic link library) management, scheduling, interprocess messaging, memory management, and file system management.

The computer 202 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through an non-removable memory interface such as interface 240, and magnetic disk drive 251 and optical disk drive 255 are typically connected to the system bus 221 by a removable memory interface such as interface 250.

The drives and their associated computer storage media discussed above and illustrated in FIG. 3 provide storage of computer-readable instructions, data structures, program modules, and other data for computer 202. In FIG. 3, for example, hard disk drive 241 is illustrated as storing operating system 244, application programs 245, other program modules 246, and program data 247. Note that these components can either be the same as or different from operating system 210, application programs 208, other program modules 236, and program data 237. Operating system 244, application programs 245, other program modules 246, and program data 247 are given different numbers here to illustrate that, at a minimum, they are different copies. A user may enter commands and information into the computer 202 through input devices such as a keyboard 262 and pointing device 261, commonly referred to as a mouse, trackball, or touch pad. Other input devices (not shown) may include a microphone, joystick, game pad, satellite dish, scanner, or the like. These and other input devices are often connected to the processing unit 204 through a user input interface 260 that is coupled to the system bus, but may be connected by other interface and bus structures, such as a parallel port, game port, or a universal serial bus (USB). A monitor 291 or other type of display device is also connected to the system bus 221 via an interface, such as a video interface 290.

The computer may operate in a networked environment using logical connections to one or more remote computers, such as a remote computer 280. The remote computer 280 may be a personal computer, a server, a router, a network PC, a peer device or other common network node, and typically includes many or all of the elements described above relative to computer 202. The logical connections depicted in FIG. 3 include a local area network (LAN) 271 and a wide area network (WAN) 273, but may also include other networks. Such networking environments are commonplace in offices, enterprise-wide computer networks, intranets, and the Internet.

When used in a LAN networking environment, the computer 202 is connected to the LAN 271 through a network interface or adapter 270. When used in a WAN networking environment, the computer 202 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 202, or portions thereof, may be stored in the remote memory storage device. By way of example, and not limitation, FIG. 3 illustrates remote application programs 285 as residing on memory device 281. It will be appreciated that the network connections shown are exemplary and other means of establishing a communications link between the computers may be used.

Exemplary Procedure

Figure 4:
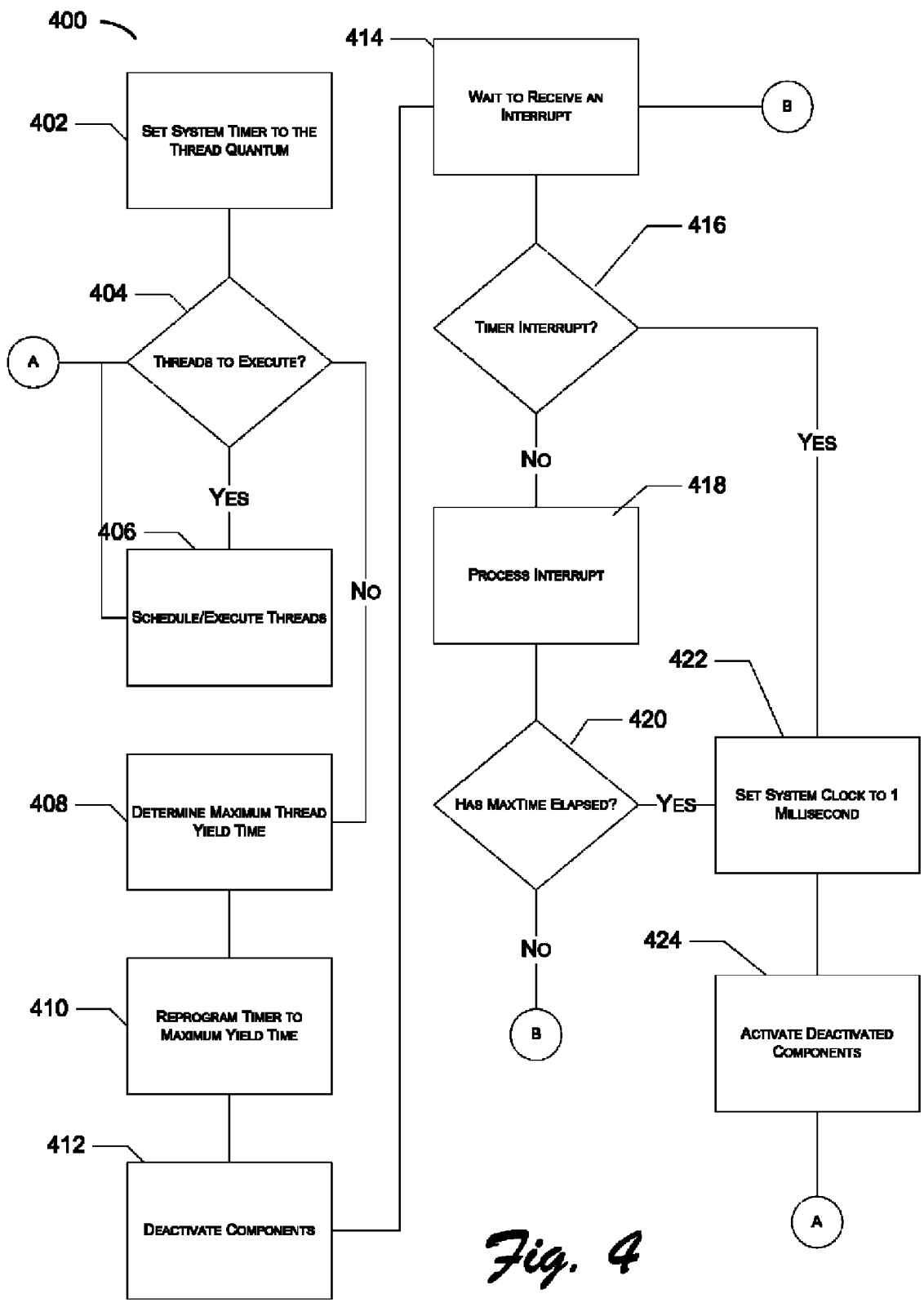
FIG. 4 is a flowchart diagram that illustrates aspects of an exemplary procedure to provide dynamically variable idle time thread scheduling.

FIG. 4 is a flowchart diagram that illustrates aspects of an exemplary procedure 400 that provides dynamic variable idle time scheduling to allow low-power consumption in a device with a high system tick rate.

In step 402, the procedure sets a hardware timer (see, the hardwire timer 214 of FIG. 2) in a device to a predetermined periodic time interval that represents the thread quantum. In step 404, the procedure determines if there are any threads to execute. If there are threads to execute, in step 406, the procedure schedules the threads for execution.

In step 408, having determined that there are no threads to execute (step 404), the procedure determines the maximum amount of time that a thread can yield, or wait before it needs to be rescheduled. This maximum amount of time is dynamically variable because it is based on a sleep state that is determined by at least a subset of the sleep times indicated by any threads in the sleep queue. Thus, it can change based on a threads specified yield time. Moreover, the dynamic variable amount of time is independent of the predetermined periodic time interval of step 402.

In step 410, the procedure reprograms the system timer to send a notification upon expiration of the maximum amount of time. In step 412, the procedure deactivates at least a subset of components selected from a group of components comprising one or more hardware elements coupled to the device, one or more program modules that comprise the operating system, and one or more of a set of modules that comprise application program modules.

In step 414, the procedure waits to receive an interrupt. Responsive to receiving an interrupt (step 414), in step 416, the procedure determines if the received interrupt is a system timer interrupt that corresponds to an expiration of the dynamic variable amount of time since step 412 was performed. In step 422, the received interrupt being a system timer interrupt (step 416), the procedure resets the system clock the predetermined periodic time interval that represents the thread quantum. At step 424, the procedure re-activates the deactivated at least one subset of components (step 410) such that the device schedules threads to execute based on the thread quantum.

In step 418, the interrupt having been determined not to be a timer interrupt (step 416), the procedure processes the interrupt. Because the notification was not a timer notification corresponding to an expiration of the dynamic variable amount of time (see, step 412), some other external event occurred. In step 420, the procedure determines if the maximum amount of time that a thread can wait before it needs to be executed has elapsed. If so, the procedure continues at step 422 as discussed above. Otherwise, the procedure continues at step 414 as discussed above.

CONCLUSION

Although the subject matter has been described in language specific to structural features and/or methodological operations, it is to be understood that the subject matter defined in the appended claims is not necessarily limited to the specific features or operations described. Rather, the specific features and steps are disclosed as preferred forms of implementing the claimed subject matter.

The invention claimed is:

1. A computer implemented method for providing thread scheduling in a device, the device comprising one or more hardware elements operatively coupled to an operating system comprising a plurality of program modules, the method comprising:
    scheduling one or more threads according to a predetermined periodic rate;
    determining whether or not there are any threads to execute; and
    responsive to a determination that there are no threads to execute, determining by a scheduler a dynamic variable amount of time based on a maximum amount of time that a thread can yield before needing to be scheduled for execution, wherein the maximum amount of time is based on a sleep state of a set of threads in a sleep queue, the dynamic variable amount of time being independent of the predetermined periodic rate, a key press event, and any event associated with release of a resource, and deactivating one or more of the hardware elements and the program modules for said dynamic variable amount of time, wherein the one or more of the hardware elements and the program modules are going to be activated again only when the operating system needs to perform scheduling a thread for execution upon expiration of the dynamic variable amount of time since the deactivating.

2. The method of claim 1, wherein the device is a battery powered device.

3. The method of claim 1, wherein the predetermined periodic rate is a millisecond.

4. The method of claim 1, further comprising activating the one or more of the hardware elements and the program modules only when the operating system needs to perform an action selected from a group of actions comprising scheduling a thread for execution upon expiration of the dynamic variable amount of time since the deactivating, or upon receipt of an external event that is not a system timer event.

5. The method of claim 1, wherein the scheduling further comprises setting a system timer to the predetermined periodic rate, the predetermined periodic rate corresponding to a thread scheduling accuracy; and
    wherein the deactivating further comprises resetting the system timer to generate a notification after the dynamic variable amount of time has elapsed since the deactivating.

6. The method of claim 1, wherein the deactivating further comprises resetting a system timer to generate a notification after the dynamic variable amount of time has elapsed.

7. A computer storage medium containing computer-executable instructions for scheduling threads in a device, the device including an operating system comprised of a plurality of program modules that are in turn coupled to one or more hardware elements, the computer-executable instructions comprising instructions for:
    determining at a periodic rate whether or not there are any threads to execute; and
    responsive to a determination that there are no threads to execute, determining by a scheduler a dynamic variable amount of time based on a maximum amount of time that a thread can yield before needing to be scheduled for execution, wherein the maximum amount of time is based on a sleep state of a set of threads in a sleep queue, the dynamic variable amount of time being independent of the predetermined periodic rate, a key press event, and any event associated with release of a resource, and deactivating one or more of the program modules and the hardware elements for said dynamic variable amount of time, wherein the one or more of the hardware elements and the program modules are going to be activated again only when the operating system needs to perform scheduling a thread for execution upon expiration of the dynamic variable amount of time since the deactivating.

8. The computer storage medium of claim 7, wherein the device comprises a battery powered device.

9. The computer storage medium of claim 7, wherein the computer-executable instructions further comprise instructions for:
in the deactivating, configuring a system timer to send a first timer interrupt after the dynamic variable amount of time has elapsed; and
responsive to receiving the first timer interrupt:
   a) configuring the system timer to send a second timer interrupt at the periodic rate; and
   (b) activating the one or more of the program modules and the hardware elements to determine if there are any threads to execute.

10. The computer storage medium of claim 7, wherein the computer-executable instructions further comprise instructions for:
receiving an external interrupt before the dynamic variable amount of time has elapsed since the deactivating, the external interrupt not being a system timer interrupt; and
responsive to receiving the external interrupt, processing the external interrupt such that the one or more of the program modules and the hardware elements remain deactivated for the dynamic variable amount of time.

11. A device comprising:
a processor;
a plurality of hardware elements coupled to the processor; and
a memory coupled to the processor, the memory comprising computer-program instructions executable by the processor, the computer-program instructions comprising a scheduler program module, a hardware abstraction layer (HAL) program module, one or more operating system program modules, and a set of application program modules;
wherein the scheduler comprises computer-executable instructions for:
   scheduling threads for execution at a periodic time interval;
   determining that there are no threads to execute;
   in response to there are no thread to execute, determining a dynamic variable amount of time based on a maximum amount of time that a thread can yield before needing to be scheduled for execution, wherein the maximum amount of time is based on a sleep state of a set of threads in a sleep queue, the dynamic variable amount of time being independent of the predetermined periodic rate, a key press event, and any event associated with release of a resource; and
   wherein the HAL, responsive to the determining there are no threads to execute and to the dynamic variable amount of time, further comprises computer-executable instructions for deactivating, for said dynamic variable amount of time, the scheduler, the hardware elements, the one or more operating system program modules, and the set of application program modules.

12. The device of claim 11, wherein the periodic time interval is a millisecond.

13. The device of claim 11, wherein the device comprises a battery powered device.

14. The device of claim 11, wherein the operating system is a Microsoft WINDOWS CE, Linux, WindRiver, QNX, or Palm® operating system.

15. The device of claim 11, wherein the HAL further comprises computer-executable instructions for re-activating at least one subset of components after the dynamic variable amount of time has elapsed since the one or more operating system program modules, the set of application program modules and the hardware elements were deactivated.

16. The device of claim 15, wherein the scheduler is re-activated in a manner that allows the scheduler to schedule threads based on the periodic time interval.

17. The device of claim 11, wherein after the scheduler is deactivated, the HAL further comprises computer-executable instructions for receiving a notification in response to an external event, the external event not being a system timer event, responsive to receipt of the notification, the HAL processing the notification in a manner that the scheduler remains deactivated for the dynamic variable amount of time.

* * * * *